(12) United States Patent
Nishio et al.

(10) Patent No.: US 11,447,653 B2
(45) Date of Patent: Sep. 20, 2022

(54) COATING MATERIAL, PRINTING MEMBER FOR DOT PRINTING, AND PTP PACKAGING BODY

(71) Applicant: UACJ CORPORATION, Tokyo (JP)

(72) Inventors: Hiroshi Nishio, Tokyo (JP); Osamu Katoh, Tokyo (JP); Yukie Kitada, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 669 days.

(21) Appl. No.: 16/088,927

(22) PCT Filed: Mar. 24, 2017

(86) PCT No.: PCT/JP2017/012148
§ 371 (c)(1),
(2) Date: Sep. 27, 2018

(87) PCT Pub. No.: WO2017/170269
PCT Pub. Date: Oct. 5, 2017

(65) Prior Publication Data
US 2020/0325354 A1   Oct. 15, 2020

(30) Foreign Application Priority Data

Mar. 28, 2016   (JP) .............................. JP2016-064183

(51) Int. Cl.
| | | |
|---|---|---|
| C09D 127/06 | (2006.01) | |
| C09D 131/04 | (2006.01) | |
| A61J 1/03 | (2006.01) | |
| B41F 13/11 | (2006.01) | |
| B65D 65/42 | (2006.01) | |
| B65D 75/32 | (2006.01) | |
| B41M 5/52 | (2006.01) | |

(52) U.S. Cl.
CPC ............. *C09D 127/06* (2013.01); *A61J 1/035* (2013.01); *B41F 13/11* (2013.01); *B41M 5/52* (2013.01); *B41M 5/5254* (2013.01); *B65D 65/42* (2013.01); *B65D 75/327* (2013.01); *C09D 131/04* (2013.01)

(58) Field of Classification Search
CPC ............................ C09D 127/06; C09D 131/04
See application file for complete search history.

(56) References Cited

U.S. PATENT DOCUMENTS 4,664,981 A * 5/1987 Ogawa ................. G11B 5/7022
                                                    252/62.54

FOREIGN PATENT DOCUMENTS

| EP | 0 751 005 | 1/1997 |
|---|---|---|
| JP | 5-200941 | 8/1993 |
| JP | 2007-145428 | 6/2007 |
| JP | 2009-114256 | 5/2009 |
| JP | 2014-59854 | 4/2014 |
| JP | 2015-091718 | 5/2015 |

OTHER PUBLICATIONS

Machine translation of JPH05200941 (Year: 1993).*
Extended European Search Report dated Nov. 20, 2019 in corresponding European Patent Application No. 17 774 806.8.
International Search Report dated May 9, 2017 in International (PCT) Application No. PCT/JP2017/012148.

* cited by examiner

*Primary Examiner* — Wenwen Cai
(74) *Attorney, Agent, or Firm* — Wenderoth, Lind & Ponack, L.L.P.

(57) ABSTRACT

The present invention provides a coating material that can improve gravure printing characteristics of the printing surface of a printing substrate to favorably transfer an ink fed in the cell of a gravure printing roll to the printing surface of the printing substrate, thereby achieving the beautiful gravure printing. The coating material of the present invention is a coating material for forming a surface layer, serving as a printing surface, on a printing substrate on which gravure printing is to be performed, and the coating material is characterized by including a vinyl chloride-vinyl acetate-unsaturated fatty acid copolymer that includes 80 to 90% by mass of a component of vinyl chloride, 9.2 to 19.5% by mass of a component of vinyl acetate, and 0.1 to 0.8% by mass of a component of an unsaturated fatty acid.

5 Claims, 2 Drawing Sheets

COATING MATERIAL, PRINTING MEMBER FOR DOT PRINTING, AND PTP PACKAGING BODY

TECHNICAL FIELD

The present invention relates to a coating material, a printing member for dot printing, and a PTP packaging body.

BACKGROUND ART

At present, when prescribing a drug at a domestic hospital or pharmacy, a pharmacist prescribes the drug in accordance with a prescription issued by a physician. In order to prevent a prescribing error, a plurality of pharmacists check if a type and quantity of the drug they are about to prescribe to a patient are the same as a type and quantity of the drug described in the prescription.

However, it is difficult to completely prevent a human error even if the checking is performed by the plurality of pharmacists. Thus, a measure to prevent a prescribing error has been demanded. In view of this, it is obliged to print a bar code on a rear surface of a PTP packaging body (press-through package) with an expectation that the use of the bar code can prevent the prescribing error.

In general, 10 or 12 tablets are stored in a single PTP packaging body. In a case where the number of the tablets prescribed to the patient is the same as or a multiple of the number of the tablets stored in the PTP packaging body, one or a plurality of the PTP packaging bodies are accordingly prescribed to the patient. In such a case, the bar code provided on the PTP packaging body can be used.

On the other hand, in a case where the number of the tablets prescribed to the patient is neither the same as nor a multiple of the number of the tablets stored in the PTP packaging body, the PTP packaging body is divided into a fraction to prescribe the drug to the patient. In general, only one bar code is printed on the PTP packaging body, thus the PTP packaging body divided into a fraction often loses the bar code. This causes a problem in that the bar code cannot be used for the checking to prevent the prescribing error.

In order to solve the above-described problem occurring when the PTP packaging body is divided into a fraction, the bar code may be printed on a sealing film of the PTP packaging body in each area corresponding to a tablet storing portion.

Gravure printing is usually used to print the bar code on the PTP packaging body. The gravure printing is a printing method to perform printing on a printing substrate by feeding an ink to a cell formed on a surface of a gravure printing roll and transferring the ink to the printing substrate.

Further, Patent Literature 1 discloses a gravure printing ink for surface printing that contains an inactive particulate filler having an average particle diameter of 0.5 to 2.5 μm, a pigment, a binder resin, and a solvent.

CITATION LIST

Patent Literature

Patent Literature 1: Japanese Patent Application Laid-Open No. 2009-114256

SUMMARY OF INVENTION

Technical Problem

However, the appearance of the PTP packaging body significantly changes by printing the bar code on the sealing film of the PTP packaging body in each area corresponding to the tablet storing portion. Such a change in the appearance of the PTP packaging body causes other problems such as making the patient worry that the prescribed drug may be wrong and inducing a risk that the pharmacist makes an prescribing error. Thus, a printing technique by which printing is performed on the PTP packaging body without changing the appearance of the PTP packaging body as much as possible has been demanded.

On the other hand, the gravure printing using the gravure printing ink for surface printing described in Patent Literature 1 can print an image of normal size that is visually recognizable by human eyes, such as a bar code, on the sealing film. However, such printing has an issue of having difficulty in performing the gravure printing on the PTP packaging body without changing the appearance of the PTP packaging body as much as possible.

Further, as described above, the gravure printing performs printing on a surface of the printing substrate by bringing the printing substrate into contact with the surface of the gravure printing roll and transferring the ink fed to the cell of the gravure printing roll to the printing substrate. As a result of diligent researches, the present inventor has found that the gravure printing is affected not only by the ink, but also largely affected by properties of the printing surface of the printing substrate.

The present invention provides a coating material that improves gravure printing characteristics of the printing surface of a printing substrate to favorably transfer the ink fed in the cell of a gravure printing roll to the printing surface of the printing substrate, thereby achieving the beautiful gravure printing. In particular, the present invention provides a coating material that achieves dot printing with size that is hardly visually recognizable by human eyes on the printing surface of the printing substrate, as well as a printing member for dot printing and a PTP packaging body prepared by using the coating material.

Means for Solving Problem

A coating material of the present invention is a coating material for forming a surface layer serving as a printing surface on a printing substrate to which gravure printing is to be applied, and the coating material is characterized by including a vinyl chloride-vinyl acetate-unsaturated fatty acid copolymer that includes 80 to 90% by mass of a component of vinyl chloride, 9.2 to 19.5% by mass of a component of vinyl acetate, and 0.1 to 0.8% by mass of a component of an unsaturated fatty acid.

Advantageous Effects of Invention

The coating material of the present invention having such a configuration described above can form the surface layer excellent in surface smoothness on the printing surface of a printing substrate to which the gravure printing is to be applied.

The surface layer formed using the coating material of the present invention has the excellent surface smoothness. Thus, when the surface layer serving as the printing surface of the printing substrate is brought into contact with a surface of a gravure printing roll, an ink stored in a cell of the gravure printing roll can be brought into contact with the surface layer on the printing substrate with a wide contact area.

Thus, even if the cell of the gravure printing roll has a small opening area, the ink stored in the cell can be

DESCRIPTION OF EMBODIMENTS

Figure 1:
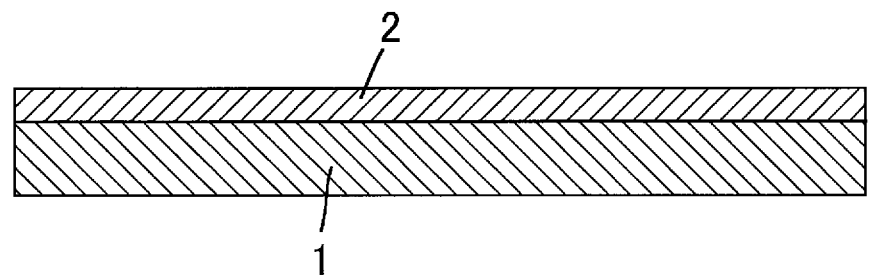
FIG. 1 is a cross-sectional view illustrating a printing substrate integrated with a surface layer by lamination.
Figure 2:
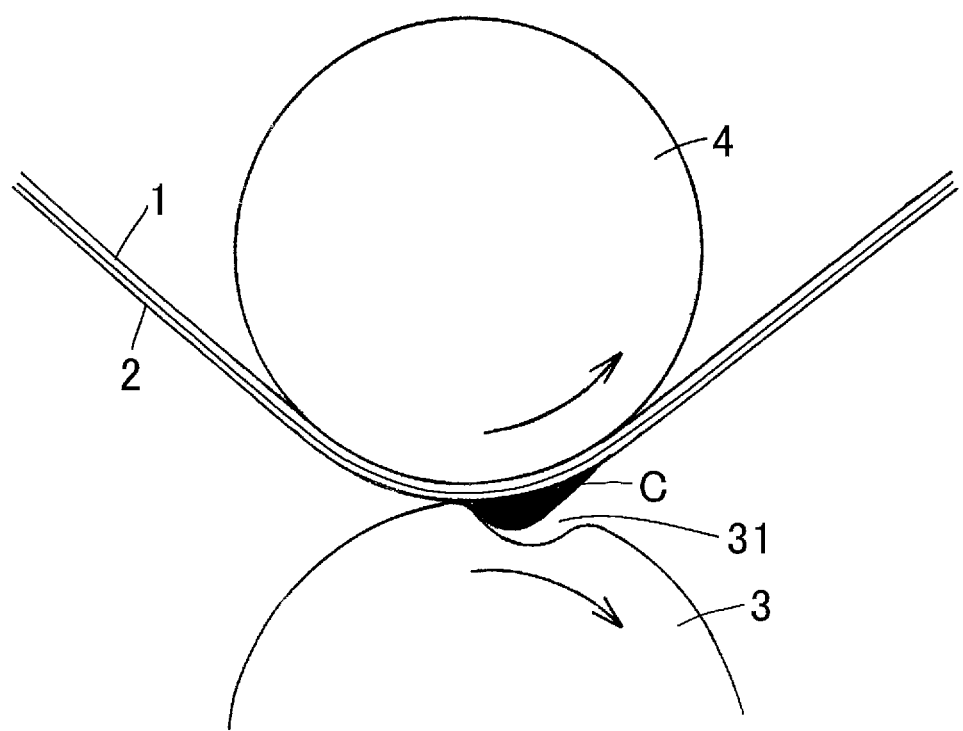
FIG. 2 is a schematic view illustrating how gravure printing is applied to the surface layer on the printing substrate.

A coating material of the present invention is a coating material for forming a surface layer serving as a printing surface on a printing substrate to which gravure printing is to be applied, and the coating material is characterized by including a vinyl chloride-vinyl acetate-unsaturated fatty acid copolymer that includes 80 to 90% by mass of a component of vinyl chloride, 9.2 to 19.5% by mass of a component of vinyl acetate, and 0.1 to 0.8% by mass of a component of an unsaturated fatty acid.

The coating material of the present invention is applied to one surface of the printing substrate to form the surface layer. A coating film of the coating material is formed on a surface of the printing substrate where the coating material is applied, and such a coating film forms a printing undercoat (the surface layer).

The coating material includes a binder. The coating material includes the vinyl chloride-vinyl acetate-unsaturated fatty acid copolymer as the binder. The vinyl chloride-vinyl acetate-unsaturated fatty acid copolymer has excellent affinity to a pigment included in the coating material and thus allows the pigment to be finely dispersed without aggregation in the coating material. Further, the copolymer allows the surface layer (a coating film) to be formed in a state that the pigment is finely dispersed without aggregation also in the surface layer formed by the coating material. Thus, the surface layer formed by the coating material is excellent in surface smoothness and a dot having a fine diameter can be exquisitely printed on the surface layer by gravure printing.

An unsaturated fatty acid constituting the vinyl chloride-vinyl acetate-unsaturated fatty acid copolymer has an ethylenic unsaturated bond (preferably an ethylenic unsaturated double bond) in its molecule and constitutes a polymer by radical polymerization with vinyl chloride and vinyl acetate by intermediary of the ethylenic unsaturated bonds.

The unsaturated fatty acid includes one or a plurality of carboxy groups (—COOH) in its molecule and the unsaturated fatty acid preferably includes a plurality of carboxy groups. The unsaturated fatty acid having a plurality of carboxy groups has more excellent affinity to the pigment and thus allows the pigment to be finely dispersed without aggregation in the coating material. Further, such an unsaturated fatty acid allows the surface layer (the coating film) to be formed in a state that the pigment is finely dispersed without aggregation also in the surface layer formed by the coating material. Thus, the surface layer formed by the coating material is more excellent in the surface smoothness and the dot having a fine diameter can be more exquisitely printed on the surface layer by the gravure printing.

The unsaturated fatty acid is not particularly limited, however, fumaric acid, maleic acid, itaconic acid, succinic acid, acrylic acid, and methacrylic acid are preferable, and fumaric acid is more preferable.

The content of the component of vinyl chloride in the vinyl chloride-vinyl acetate-unsaturated fatty acid copolymer is 80 to 90% by mass, and preferably 82 to 90% by mass. The copolymer having the content of the component of vinyl chloride within the above range has excellent affinity to the pigment and thus allows the pigment to be finely dispersed without aggregation in the coating material. Further, such a copolymer allows the surface layer (the coating film) to be formed in a state that the pigment is finely dispersed without aggregation also in the surface layer formed by the coating material. Thus, the surface layer formed by the coating material is excellent in the surface smoothness and the dot having a fine diameter can be exquisitely printed on the surface layer by the gravure printing.

The content of the component of vinyl acetate in the vinyl chloride-vinyl acetate-unsaturated fatty acid copolymer is 9.2 to 19.5% by mass, and preferably 9.2 to 17.5% by mass. The copolymer having the content of the component of vinyl acetate within the above range has excellent affinity to the pigment and thus allows the pigment to be finely dispersed without aggregation in the coating material. Further, such a copolymer allows the surface layer (the coating film) to be formed in a state that the pigment is finely dispersed without aggregation also in the surface layer formed by the coating material. Thus, the surface layer formed by the coating material is excellent in the surface smoothness and the dot having a fine diameter can be exquisitely printed on the surface layer by the gravure printing.

The content of the component of unsaturated fatty acid in the vinyl chloride-vinyl acetate-unsaturated fatty acid copolymer is 0.1 to 0.8% by mass, and preferably 0.3 to 0.8% by mass. The copolymer having the content of the component of unsaturated fatty acid within the above range has excellent affinity to the pigment and thus allows the pigment to be finely dispersed without aggregation in the coating material. Further, such a copolymer allows the surface layer (the coating film) to be formed in a state that the pigment is finely dispersed without aggregation also in the surface layer formed by the coating material. Thus, the surface layer formed by the coating material is excellent in the surface smoothness and the dot having a fine diameter can be exquisitely printed on the surface layer by the gravure printing.

The number-average molecular weight of the vinyl chloride-vinyl acetate-unsaturated fatty acid copolymer is preferably 8,000 to 30,000, more preferably 10,000 to 20,000, and particularly preferably 13,000 to 18,000. The vinyl chloride-vinyl acetate-unsaturated fatty acid copolymer having the number-average molecular weight within the above range allows the pigment to be finely dispersed without aggregation in the coating material. Further, such a copolymer allows the surface layer (the coating film) to be formed in a state that the pigment is finely dispersed without aggregation also in the surface layer formed by the coating material. Thus, the surface layer formed by the coating material is excellent in the surface smoothness and the dot having a fine diameter can be exquisitely printed on the surface layer by the gravure printing.

The molecular weight distribution (weight-average molecular weight/number-average molecular weight) of the vinyl chloride-vinyl acetate-unsaturated fatty acid copolymer is preferably 1 to 10, more preferably 2 to 8, and particularly preferably 3 to 5. The vinyl chloride-vinyl acetate-unsaturated fatty acid copolymer having the molecular weight distribution within the above range allows the pigment to be finely dispersed without aggregation in the coating material. Further, such a copolymer allows the surface layer (the coating film) to be formed in a state that the pigment is finely dispersed without aggregation also in the surface layer formed by the coating material. Thus, the surface layer formed by the coating material is excellent in the surface smoothness and the dot having a fine diameter can be exquisitely printed on the surface layer by the gravure printing.

Note that the weight-average molecular weight and number-average molecular weight of the vinyl chloride-vinyl acetate-unsaturated fatty acid copolymer are measured by gel permeation chromatography (GPC) using polystyrene calibration.

The coating material may further include the pigment. Any pigments conventionally used in the coating material may be used without particular limitation; however, an inorganic particulate is preferable. The coating film obtained by drying the coating material is colored by the pigment. The vinyl chloride-vinyl acetate-unsaturated fatty acid copolymer serving as the binder has excellent affinity to the pigment and thus allows the pigment to be uniformly dispersed without aggregation in the coating film. As a result, the surface layer (the coating film) obtained from the coating material is colored by the pigment without having color unevenness, thereby forming an excellent printing undercoat for the gravure printing. Further, the pigment is finely dispersed without aggregation in the surface layer, and thus the surface layer has the excellent surface smoothness.

As the inorganic particulate, those generally used as such a pigment may be used. Examples of the inorganic particulate include a silica particulate, a zinc oxide particulate, a titanium oxide particulate, a zirconium oxide particulate, an aluminum oxide particulate, a tin oxide particulate, an indium oxide particulate, a zirconium oxide particulate, an antimony oxide particulate, a magnesium oxide particulate, and a composite oxide particulate containing any of these particulates as a main component, a calcium carbonate particulate, talc, clay, a calcined kaolin particulate, a calcined calcium silicate particulate, an aluminum silicate particulate, a magnesium silicate particulate, and a calcium phosphate particulate. Of these, a titanium oxide particulate is preferable.

The average particle diameter of the pigment is preferably 0.20 to 0.60 μm, more preferably 0.30 to 0.50 μm, and particularly preferably 0.38 to 0.49 μm. Having the average particle diameter of the pigment within the above-described range can improve the surface smoothness of the surface layer formed by the coating material and allows the surface layer serving as the printing surface to be formed without color unevenness.

The average particle diameter of the pigment can be measured using a laser diffraction/scattering type particle size analyzer. For example, a laser diffraction/scattering type particle size analyzer, commercially available from Horiba Ltd. under a trade name "LA-920", is used to measure a volume-average particle diameter under the following conditions: dispersion solvent: ethanol, circulation rate: 4, ultrasonic dispersion time: 1 minute. The volume-average particle diameter thus obtained is used as the average particle diameter of the pigment.

The coating material may include a solvent as necessary to adjust the viscosity. Examples of the solvent include methyl ethyl ketone, toluene, and ethyl acetate.

The content of the pigment in the coating material is preferably 50 to 400 parts by mass, more preferably 100 to 300 parts by mass, and particularly preferably 100 to 150 parts by mass, relative to 100 parts by mass of the binder. Having the content of the pigment in the coating material of 50 parts by mass or more achieves the excellent surface smoothness of the surface layer formed by the coating material and allows the surface layer serving as an undercoat for the gravure printing to be formed without color unevenness. Thus, the printing can be beautifully performed on the surface layer, serving as the printing surface, by the gravure printing. In particular, dot printing whose dot diameter is fine can be exquisitely performed on the surface layer. Having the content of the pigment in the coating material of 400 parts by mass or less can improve the surface smoothness of the coating film formed by the coating material and achieves beautiful printing on the surface layer, serving as the printing surface, by the gravure printing. In particular, the dot printing whose dot diameter is fine can be exquisitely performed on the surface layer.

The coating material may include an additive, such as an ultraviolet absorber, a light stabilizer, an antioxidant, a thermal polymerization inhibitor, a leveling agent, a defoaming agent, a thickener, a settling inhibitor, an infrared absorber, a fluorescent brightening agent, a dispersant, a conductive particulate, an antistatic agent, an antifogging agent, and a coupling agent, within a range that does not impair properties of the coating material.

The coating material is applied to a surface of a printing substrate 1 on which the gravure printing is to be performed and then dried as necessary to form a coating film. Such a coating film constitutes a surface layer 2. The surface layer 2 formed on the printing substrate 1 serves as the printing surface on which the gravure printing is to be performed (see FIG. 1).

The printing substrate 1 is not particularly limited as long as it is a conventionally known substrate on which the gravure printing is to be performed, and examples thereof include a metal foil such as an aluminum foil, a synthetic resin film, and a paper.

The printing substrate 1 on which the surface layer 2 having the excellent surface smoothness is formed allows the ink stored in the cell of the gravure printing roll to be smoothly transferred on the surface layer 2.

Specifically, when the gravure printing is performed on the printing substrate 1, the printing substrate 1 is supplied between a gravure printing roll 3 and a backup roll 4 opposed to the gravure printing roll 3 such that the surface layer 2 is faced to the gravure printing roll 3. Then, the surface layer 2 on the printing substrate 1 is pressed against the surface of the gravure printing roll 3 by the backup roll 4 to transfer an ink C stored in a cell 31 of the gravure printing roll 3 to the surface layer 2 on the printing substrate 1. The printing substrate 1 is subsequently released from the surface of the gravure printing roll 3 to complete the gravure printing on the surface of the printing substrate 1.

When the surface layer 2 on the printing substrate 1 is pressed against the surface of the gravure printing roll 3, the surface layer 2 having the excellent surface smoothness is in contact with the ink C in the cell 31 of the gravure printing roll 3 in a wide contact area, and thus the ink C in the cell can be precisely transferred to a side of the surface layer 2 to perform printing corresponding to a shape of the cell 31 of the gravure printing roll 3 on the surface layer 2.

As described above, the ink C in the cell 31 of the gravure printing roll 3 is precisely and easily transferred onto the surface layer 2. Thus, even if the cell 31 (an opening portion of the cell 31) of the gravure printing roll 3 has a fine shape, the ink C in the cell 31 is precisely transferred onto the surface layer 2. Thus, the printing substrate 1 on which the surface layer 2 has been formed can be preferably used as a printing member A for dot printing. When such a printing substrate 1 is used, a plurality of dots having fine diameters can be precisely and reliably printed independently of each other on the surface layer 2 by the gravure printing. A diameter of the dot printed on the surface layer 2 formed on the printing substrate 1 is preferably 30 to 120 μm. Note that the diameter of the dot refers to a diameter of a perfect circle having the smallest diameter that can surround the dot.

As described above, the fine dots can be precisely and reliably printed independently of each other on the surface layer 2 formed by the coating material by the gravure printing. The dot having size that is hardly visually recognizable by human eyes can be printed by the gravure printing, and thus the printing substrate 1 on which the fine dot printing has been performed on the surface layer 2 can be preferably used for a drug packaging body such as a PTP packaging body, for which a change in the appearance is unfavorable.

Figure 3:
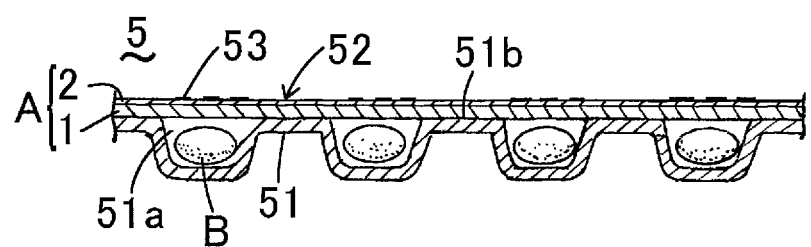
FIG. 3 is a cross-sectional view illustrating an example of a PTP packaging body.

Specifically, as shown in FIG. 3, a PTP packaging body (press-through package) 5 includes a storage sheet 51 that includes a plurality of tablet storing portions 51a for storing tablets B and a sealing sheet 52 for closing opening portions of the tablet storing portions 51a of the storage sheet 51. The tablet B includes a drug having a certain shape, and a capsule and the like are also included. The tablet B stored in the tablet storing portion 51a can be taken out by pressing the tablet storing portion 51a of the storage sheet 51 toward the sealing sheet 52 to break the sealing sheet 52.

The storage sheet 51 is usually formed in a planar rectangular shape and the plurality of the tablet storing portions 51a are formed by partially bulging a known synthetic resin sheet using a general thermoforming method. Note that examples of a synthetic resin constituting the synthetic resin sheet include a polyester-based resin such as a polyethylene terephthalate sheet, a polyvinyl chloride-based resin such as polyvinyl chloride, and a polystyrene-based resin. Examples of the thermoforming method include a vacuum forming method and a pressure forming method.

Then, as shown in FIG. 3, the sealing sheet 52 is integrated by lamination with a surface 51b of the storage sheet 51 where the opening portions of the tablet storing portions 51a are formed in order to close the opening portions of the tablet storing portions 51a.

The sealing sheet 52 includes a printing member A for dot printing and a gravure printing layer 53 integrally formed on the surface layer 2 of the printing member A for dot printing. The printing member A for dot printing includes the printing substrate 1 and the surface layer 2 formed on the printing substrate 1. The surface layer 2 includes the coating film of the above-mentioned coating material. The gravure printing layer 53 is formed by printing performed on the surface layer 2 by the gravure printing and includes a number of dots. Note that FIG. 3 shows the PTP packaging body in which the gravure printing layer 53 is exposed to the outside; however, the gravure printing layer 53 may be arranged inside (on a side of the storage sheet 51).

The size of the dot printed on the surface layer 2 of the printing member A for dot printing is extremely small and hardly visually recognizable by human eyes, and thus the dot printing can be performed on the surface of the sealing sheet 52 without substantially changing the appearance of the PTP packaging body 5.

EXAMPLES

Hereinafter, the present invention will be described in more detail by way of examples. However, the present invention is not limited to the following examples.

Examples 1 and 2 and Comparative Example 1

A vinyl chloride-vinyl acetate-unsaturated fatty acid copolymer was prepared as a binder. The contents of the component of vinyl chloride, the component of vinyl acetate, and the component of unsaturated fatty acid in the vinyl chloride-vinyl acetate-unsaturated fatty acid copolymer were shown in Table 1. Types of the unsaturated fatty acids constituting the vinyl chloride-vinyl acetate-unsaturated fatty acid copolymers were shown in Table 1. The number-average molecular weight and molecular weight distribution (weight-average molecular weight/number-average molecular weight) of each vinyl chloride-vinyl acetate-unsaturated fatty acid copolymer were shown in Table 1. A titanium oxide particulate (average particle diameter: 0.42 μm) was prepared as a pigment.

The vinyl chloride-vinyl acetate-unsaturated fatty acid copolymer, the titanium oxide particulate, and methyl ethyl ketone as a solvent, each in a prescribed quantity shown in Table 1, were uniformly mixed to produce a coating material. Note that the quantity of the vinyl chloride-vinyl acetate-unsaturated fatty acid copolymer was described in a column of "BINDER" in Table 1.

An aluminum foil having a thickness of 20 μm was prepared as a printing substrate, and the coating material was applied to one surface of the aluminum foil and dried to form a surface layer on the one surface of the aluminum foil. A printing member for dot printing was thus produced.

An ink (manufactured by Fuji Ink Corp. under a trade name "MBA Black Ink") was prepared. Dot printing was performed using this ink on the surface layer 2 of the printing member for dot printing by the gravure printing to form a gravure printing layer containing a number of dots. A cell of a gravure printing roll had an opening portion that was formed in a planar rectangular shape having a length of 70 μm in a circumferential direction of the gravure printing roll and a length of 50 μm in an axial direction of the gravure printing roll. A depth of the opening portion was 10 μm. A distance between adjacent cells was 300 μm both in the axial direction and circumferential direction of the gravure printing roll.

Comparative Example 2

A vinyl chloride-vinyl acetate copolymer was prepared as the binder. The contents of the components of vinyl chloride and vinyl acetate in the vinyl chloride-vinyl acetate copolymer were shown in Table 1. The number-average molecular weight and molecular weight distribution (weight-average molecular weight/number-average molecular weight) of the vinyl chloride-vinyl acetate copolymer were shown in Table 1.

The coating material and the printing member for dot printing were produced in the same manner as that in Example 1 except that the vinyl chloride-vinyl acetate copolymer was used as the binder. The dot printing was performed on the surface layer 2 of the printing member for dot printing by the gravure printing in the same manner as that in Example 1 to form the gravure printing layer having a number of dots.

A fixing rate, a dot shape, and a 60° gloss were measured for the dots of the gravure printing layer formed on the surface layer of the printing member for dot printing obtained in each of Example and Comparative example in the following manner. Their results were shown in Table 1.

(Fixing rate)

A micrograph of the dots of the gravure printing layer formed on the surface layer of the printing member for dot printing was taken at a 200-fold magnification. Ten measuring zones each having a square shape with a side of 2 mm were determined in arbitrary portions on the micrograph. The number of the dots present in each measuring zone was counted. In each measuring zone, the fixing rate was calculated in accordance with the following formula. An arithmetic mean value of the fixing rates in the respective measuring zones was calculated. The arithmetic mean value was used as the fixing rate. Note that the dot partially present in the measuring zone was excluded.

Fixing rate (%)=100×(the number of dots within the measuring zone)/(the number of cells formed in the gravure printing roll per 4 mm$^2$)

(Dot Shape)

A micrograph of the dots of the gravure printing layer formed on the surface layer of the printing member for dot printing was taken at a 200-fold magnification. A measuring zone having a square shape with a side of 1 cm was determined in an arbitrary portion on the micrograph. Lengths of each dot in the measuring zone in the circumferential direction and axial direction of the gravure printing roll were measured. The arithmetic means of the lengths of the dots in the circumferential direction and in the axial direction were each calculated and the arithmetic mean values were shown in Table 1. Note that the dot partially present in the measuring zone was excluded.

(60° Gloss)

A specular gloss at 60° of the surface layer of the printing member for dot printing was measured in accordance with JIS Z8741. As the specular gloss at 60° becomes higher, the surface layer of the printing member for dot printing has the better surface smoothness.

CROSS-REFERENCE TO RELATED APPLICATION

The present application claims the priority under Japanese Patent Application No. 2016-064183 filed on Mar. 28, 2016, the disclosure of which is hereby incorporated in its entirety by reference.

INDUSTRIAL APPLICABILITY

The coating material of the present invention can form the surface layer excellent in surface smoothness on the printing surface of the printing substrate to which the gravure printing is to be applied.

The printing substrate having the surface layer formed by using the coating material of the present invention can achieve the exquisite fine dot printing on the surface layer by the gravure printing. The coating material and printing member for dot printing of the present invention can be preferably used for a drug packaging body such as a PTP packaging body.

The gravure printing layer can be formed on the surface layer of the printing member for dot printing that constitutes the sealing sheet of the PTP packaging body without substantially changing the appearance of the PTP packaging body. The appearance change can be generally prevented in such a PTP packaging body, and thus the PTP packaging body does not make a patient feel uneasy and can generally prevent a pharmacist from making a prescribing error at the time of prescribing a drug.

REFERENCE SIGNS LIST 1 printing substrate
2 surface layer
3 gravure printing roll
4 backup roll
5 PTP packaging body
51 storage sheet
51a tablet storing portion

TABLE 1

| | BINDER | | | | | |
|---|---|---|---|---|---|---|
| | CONTENT (% by mass) | | | TYPE OF | NUMBER-AVERAGE | MOLECULAR WEIGHT |
| | VINYL CHLORIDE | VINYL ACETATE | UNSATURATED FATTY ACID | UNSATURATED FATTY ACID | MOLECULAR WEIGHT | DISTRIBUTION |
| EXAMPLE 1 | 84.1 | 15.2 | 0.7 | FUMARIC ACID | 16000 | 3.4 |
| EXAMPLE 2 | 85.1 | 14.2 | 0.7 | FUMARIC ACID | 32000 | 2.6 |
| COMPARATIVE EXAMPLE 1 | 90 | 7 | 3 | ACRYLIC ACID | 33000 | — |
| COMPARATIVE EXAMPLE 2 | 85 | 15 | 0 | — | 33000 | — |

| | COATING MATERIAL (parts by mass) | | | DOT | | | |
|---|---|---|---|---|---|---|---|
| | BINDER | TITANIUM OXIDE PARTICULATE | METHYL ETHYL KETONE | FIXING RATE (%) | CIRCUMFERENTIAL DIRECTION (μm) | AXIAL DIRECTION (μm) | 60° GLOSS |
| EXAMPLE 1 | 100 | 120 | 400 | 52 | 43 | 20 | 67 |
| EXAMPLE 2 | 100 | 120 | 400 | 48 | 43 | 20 | 76 |
| COMPARATIVE EXAMPLE 1 | 100 | 120 | 400 | 12 | 43 | 20 | 54 |
| COMPARATIVE EXAMPLE 2 | 100 | 120 | 400 | 8 | 43 | 20 | 58 |

52 sealing sheet
53 gravure printing layer
A printing member for dot printing
B tablet

The invention claimed is:

1. A coating material for forming a surface layer serving as a printing surface on a printing substrate to which gravure printing is to be applied, the coating material comprising a vinyl chloride-vinyl acetate-unsaturated fatty acid copolymer that includes 80 to 90% by mass of a component of vinyl chloride, 9.2 to 19.5% by mass of a component of vinyl acetate, and 0.3 to 0.8% by mass of a component of an unsaturated fatty acid and/or succinic acid,
   wherein the unsaturated fatty acid is at least one fatty acid selected from the group consisting of fumaric acid and itaconic acid, and
   wherein the vinyl chloride-vinyl acetate-unsaturated fatty acid copolymer excludes a component of maleic acid, a component of acrylic acid and a component of methacrylic acid,
   wherein the vinyl chloride-vinyl acetate-unsaturated fatty acid copolymer has a number-average molecular weight of 8,000 to 30,000.

2. The coating material according to claim 1, wherein the vinyl chloride-vinyl acetate-unsaturated fatty acid copolymer has a molecular weight distribution (weight-average molecular weight/number-average molecular weight) of 1 to 10.

3. A printing member for dot printing by gravure printing, comprising a printing substrate; and a surface layer that is integrated by lamination on a surface of the printing substrate and includes a coating film of the coating material according to claim 1.

4. The printing member for dot printing according to claim 3, wherein the printing substrate is a metal foil.

5. A PTP packaging body comprising: a storage sheet including a tablet storing portion for storing a tablet; and a sealing sheet for closing an opening portion of the tablet storing portion of the storage sheet, the sealing sheet including the printing member for dot printing according to claim 3, and a gravure printing layer formed on the surface layer of the printing member for dot printing.

* * * * *